United States Patent
Tanaka et al.

(10) Patent No.: US 7,407,722 B2
(45) Date of Patent: Aug. 5, 2008

(54) GAS DIFFUSING ELECTRODE BODY, METHOD OF MANUFACTURING THE SAME AND ELECTROCHEMICAL DEVICE

(75) Inventors: Koichi Tanaka, Kanagawa (JP); Kenji Katori, Kanagawa (JP); Minehisa Imazato, Tokyo (JP); Kiyoshi Yamaura, Kanagawa (JP); Katsuya Shirai, Kanagawa (JP); Junji Kuyama, Kanagawa (JP)

(73) Assignee: Sony Corporation, Tokyo (JP)

( * ) Notice: Subject to any disclaimer, the term of this patent is extended or adjusted under 35 U.S.C. 154(b) by 571 days.

(21) Appl. No.: 10/468,313

(22) PCT Filed: Mar. 7, 2002

(86) PCT No.: PCT/JP02/02151

§ 371 (c)(1),
(2), (4) Date: Aug. 15, 2003

(87) PCT Pub. No.: WO02/073722

PCT Pub. Date: Sep. 19, 2002

(65) Prior Publication Data

US 2004/0076870 A1   Apr. 22, 2004

(30) Foreign Application Priority Data

Mar. 8, 2001   (JP) .............................. 2001-064814

(51) Int. Cl.
*H01M 4/88*   (2006.01)
*H01M 4/90*   (2006.01)
*H01M 4/96*   (2006.01)

(52) U.S. Cl. .......................................... 429/40; 429/42

(58) Field of Classification Search .............. 429/40–45
See application file for complete search history.

(56) References Cited

U.S. PATENT DOCUMENTS

| 3,956,014 | A | | 5/1976 | Landsman et al. |
| 4,816,431 | A | | 3/1989 | Furuya et al. |
| 5,750,013 | A | * | 5/1998 | Lin ........................ 204/192.14 |
| 6,482,763 | B2 | * | 11/2002 | Haugen et al. ............... 502/101 |
| 6,749,892 | B2 | * | 6/2004 | Chang ........................ 427/115 |

FOREIGN PATENT DOCUMENTS

| EP | 0 241 432 | 10/1987 |
| JP | 51-86733 | 7/1976 |

(Continued)

OTHER PUBLICATIONS

Che et al., *Carbon nanotubule membranes for electrochemcial energy storage and production*, Nature, vol. 393, No. 6683, May 28, 1998, pp. 346-349.

(Continued)

*Primary Examiner*—Tracy Dove
(74) *Attorney, Agent, or Firm*—Bell, Boyd & Lloyd LLP

(57) ABSTRACT

A gas diffusing electrode, an electrochemical device, such as fuel cell, employing same and methods of manufacturing same are provided. The gas diffusing electrode at least includes layers made of at least electro-conductive carbon powder or granule and sputtered platinum layers made of platinum laid alternately to form a multilayer structure. The electrochemical device can be down-sized while maintaining a relatively high power generating capacity.

3 Claims, 10 Drawing Sheets

FOREIGN PATENT DOCUMENTS

| | | |
|---|---|---|
| JP | 60133661 A * | 7/1985 |
| JP | 62-165863 | 7/1987 |
| JP | 62-208554 | 9/1987 |
| JP | 63-64266 | 3/1988 |
| JP | 3-254066 | 11/1991 |
| JP | 5-36418 | 2/1993 |
| JP | 8-88008 | 4/1996 |
| JP | 11-25992 | 1/1999 |
| JP | 11-510311 | 9/1999 |
| JP | 2001-15123 | 1/2001 |
| WO | WO 97/21256 | 6/1997 |

OTHER PUBLICATIONS

Chiang et al., *Efficient Synthesis of Polyhydroxylated Fullerene Derivatives via Hydrolysis of Polycyclosulfated Precursors*, J. Org. Chem., 1994, 59, 3960-3968.

Chiang et al., *Multi-hydroxy Additions onto $C_{60}$ Fullerene Molecules*, J. Chem. Soc., 1992, pp. 1791-1793.

* cited by examiner

GAS DIFFUSING ELECTRODE BODY, METHOD OF MANUFACTURING THE SAME AND ELECTROCHEMICAL DEVICE

CROSS REFERENCE TO RELATED APPLICATIONS

This patent application claims priority to Japanese Patent Document No. P2001-064814 filed on Mar. 8, 2001, the disclosure of which is herein incorporated by reference.

BACKGROUND OF THE INVENTION

The present invention relates to a gas diffusing electrode body that can be used, for example, for manufacturing a fuel cell, to a method of manufacturing such an electrode body and also to an electrochemical device.

In recent years, there has been an ever-increasing strong demand for alternative clean energy sources that can replace fossil fuel including petroleum. Hydrogen and hydrogen gas fuel are attracting attention as such energy sources.

It is believed that hydrogen is an ideal energy source because it contains a large amount of chemical energy per unit mass and emits neither harmful substances nor gas that warms the earth. Hydrogen is a clean, ubiquitous and inexhaustible energy source.

Recently, efforts have been paid to develop fuel cells adapted to draw electric energy out of hydrogen energy. Expected applications of such fuel cells include large scale power plants, on-site home power generators and power sources of electric automobiles.

A fuel cell is formed by arranging fuel electrodes, which may typically be a hydrogen electrode and an oxygen electrode, oppositely with a proton conductor film sandwiched between them. A cell reaction occurs to give rise to electromotive power as hydrogen and oxygen are supplied to the respective electrodes as fuel. When manufacturing a fuel cell, a proton conductor film and fuel electrodes, which may typically include a hydrogen electrode and an oxygen electrode, are molded separately and subsequently bonded together.

The fuel electrodes, or gas diffusing electrodes, of a fuel cell, which may typically include a hydrogen electrode and an oxygen electrode, are mainly made of electro-conductive carbon particles and have a catalyst layer that carries catalyst metal such as platinum.

Conventionally, a gas diffusing electrode is manufactured either by molding catalyst particles, which are powdery or granular electro-conductive carbon particles carrying platinum as catalyst, into a sheet along with water-repelling resin such as fluorine resin and an ion conducting material or by using a step of directly applying the catalyst and the other ingredients onto a carbon sheet. Japanese Patent Application Laid-Open Publication No. 5-36418 discloses a gas diffusing electrode to be used for a solid polymer fuel cell, which is manufactured by applying powdery or granular carbon carrying platinum onto a carbon sheet along with water-repelling resin and an ion conducting material.

A gas diffusing electrode refers to an electrode having continuous pores through which working gas can be diffused. A gas diffusing electrode also shows an electron conducting property.

When a gas diffusing electrode is used as hydrogen decomposing electrode of a fuel cell that may be of a solid polymer type, fuel is ionized by the catalyst of platinum and electrons produced by ionization flows through the powdery or granular electro-conductive carbon, while protons ($H^+$s) produced as a result of ionization of hydrogen flows to the ion (proton) conducting film by way of ion conductors. This process requires gaps allowing gas to pass through, electro-conductive powdery or granular carbon, ion conductors and a catalyst for ionizing fuel and/or an oxidizing agent. Fuel is ionized by the catalyst which is typically platinum and electrons produced as a result of ionization flows through the electro-conductive powdery or granular carbon, while ionized hydrogen (protons) flows to the ion conducting film by way of the ion conducting material. This process requires gaps allowing gas to pass through, electro-conductive powdery or granular carbon, ion conductors and a catalyst for ionizing fuel and/or an oxidizing agent. If fuel is hydrogen, a reaction of

takes place in the gas diffusing electrode (catalyst layer) of the fuel cell, while a reaction of

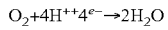

occurs in the oxygen electrode to produce water.

There is an increasing demand for fuel cells of the type under consideration that can generate a large amount of power per unit volume. However, the use of a large gas diffusing electrode is required to increase the rate of power generation. On the other hand, there is an urgent demand for fuel cells comprising a low profile gas diffusing electrode.

When the catalyst substance, which may typically be platinum, contained in the gas diffusing electrode is mixed with the other ingredients in a powdery or granular state, the area in which it is brought into contact with protons ($H^+$s) can be insufficient. In other words, the electrode reaction can be insufficient.

SUMMARY OF THE INVENTION

The present invention provides a gas diffusing electrode body that can be down-sized while maintaining its power generating performance and other characteristics, a method of manufacturing such an electrode body and an electrochemical device comprising such an electrode body.

In an embodiment of the invention, the present invention provides a gas diffusing electrode body including first layers made of at least electro-conductive powder or granule and second layers made of a catalyst substance laid alternately to form a multilayer structure.

In another embodiment of the invention, there is provided a method of manufacturing a gas diffusing electrode body by laying alternately first layers made of at least electro-conductive powder or granule and second layers made of a catalyst substance.

In still another embodiment of the present invention, there is provided an electrochemical device including a first pole, a second pole and an ion conducting body sandwiched between the poles, at least the first pole of the first and second poles being formed by a gas diffusing electrode body having a multilayer structure produced by laying alternately first layers made of at least electro-conductive powder or granule and second layers made of a catalyst substance.

According to an embodiment of the present invention, oxygen penetrating into each and every catalyst substance layers of the gas diffusing electrode body is efficiently ionized due to the use of a multilayer structure produced by laying alternately first layers made of at least electro-conductive powder or granule and second layers made of a catalyst substance so that the reaction in the related electrode is conducted efficiently as oxygen ions and protons ($H^+$s) can contact each other over a large area in each and every layer to make the electrochemical device comprising such an electrode body operate highly effectively and efficiently in each layer and hence the entire device is low-profiled.

The multilayer structure of a gas diffusing electrode body according to an embodiment of the present invention can be formed relatively easily because the layers are laid sequentially one on the other. In other words, a gas diffusing electrode body according to an embodiment of the present invention can be manufactured with an enhanced level of reproducibility.

Additional features and advantages of the present invention are described in, and will be apparent from, the following Detailed Description of the Invention and the figures.

DETAILED DESCRIPTION OF THE INVENTION

The present invention generally relates to gas diffusing electrodes, electrochemical devices that employ same, and methods of manufacturing same. A gas diffusing electrode body according to an embodiment of the present invention includes a multilayer structure of first layers and second layers and both the number of the first layers and that of the second layers are not smaller than 2 and not greater than 100. The first layers are made of at least carbon powder or granule and the second layers are made of catalyst metal. Each of the first layers has a thickness between several nanometer and several micrometers, which can include about μm in an embodiment, while each of the second layers has a thickness between several nanometers and hundreds of several nanometers. Preferably, at least one of the second layers contains platinum. On the other hand, preferably, the first layers contain electro-conductive powder or granule having an ion conducting coat and at least one of the first layers contains catalyst metal. Alternatively, it is preferable that the first layers contain electro-conductive powder or granule having a water-repelling coat and the multilayer structure is formed on a collector body or an underlayer. Preferably, the first layers are formed by at least a method selected from a spin coating method, a printing method, a spray drying method and a vapor phase film forming method, whereas the second layers are formed by a vapor phase film forming method. Preferably, the multilayer structure is formed on a collector body or an underlayer and at least the first pole or the second pole is a gas electrode. Preferably, a gas diffusing electrode body according to an embodiment of the present invention is applied to a fuel cell.

Now, the present invention will be described in greater detail by referring to the accompanying drawings that illustrate preferred embodiments of the present invention.

FIRST EMBODIMENT

Figure 1:
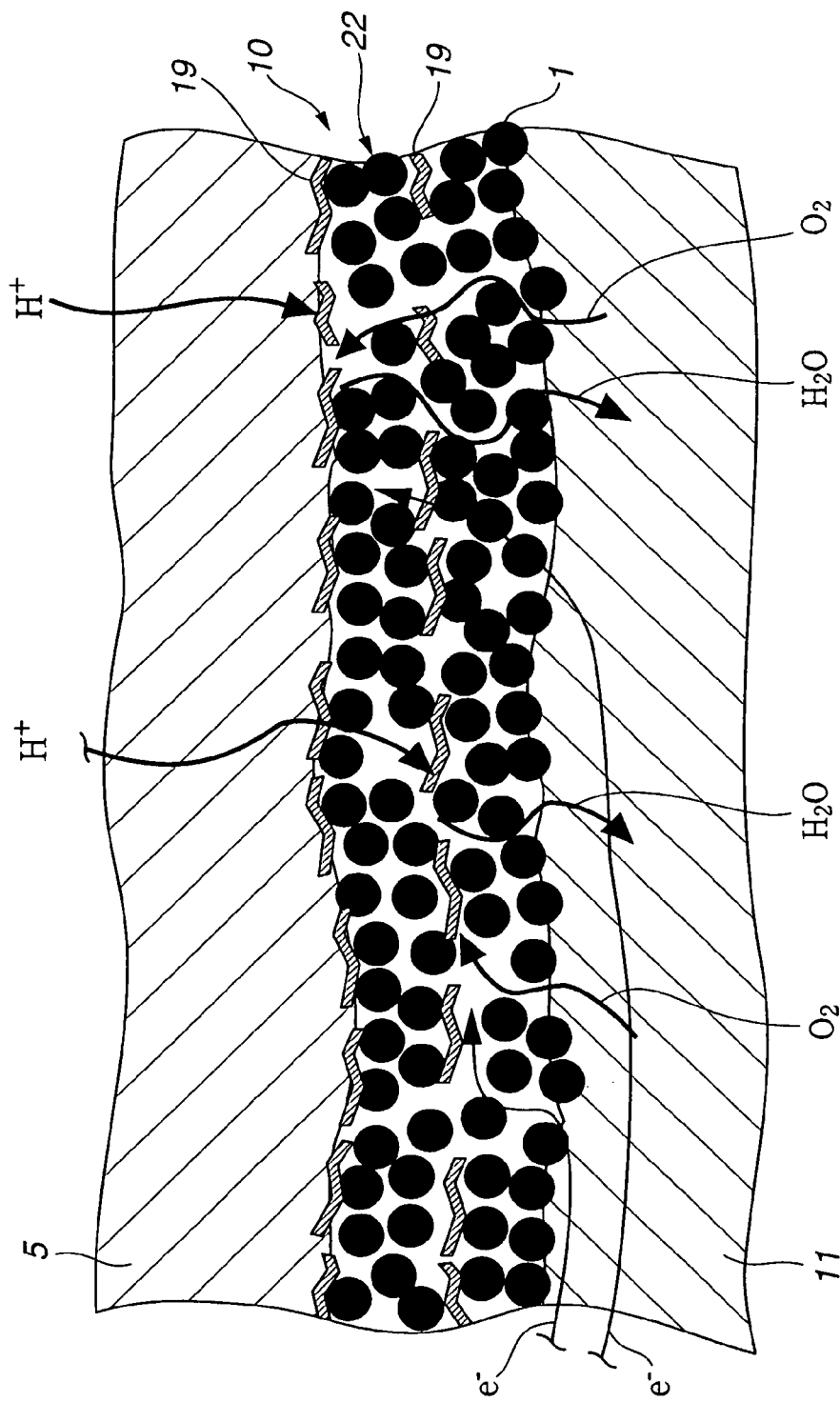
FIG. 1 is a schematic cross sectional view of part of an embodiment of gas diffusing electrode body according to an embodiment of the present invention.

Referring to FIG. 1, this embodiment of gas diffusing electrode body is realized by forming an electro-conductive carbon powder or granule layer 22 for allowing electrons to pass through on a gas-permeable collector body (carbon sheet) 11 by application, laying thereon a catalyst layer 19 typically made of platinum and adapted to turn working gas such as oxygen into oxygen ions by a vapor phase film forming method (such as sputtering) and then repeating the operation of laying an electro-conductive layer 22 and a catalyst layer 19 to produce a gas diffusing electrode (catalyst layer) 10 as oxygen pole. While FIG. 1 shows a two-layered structure for the purpose of simplicity, the embodiment is a multilayer structure having two or more than two layers, although a two-layered structure may feasibly be used according to an embodiment of the present invention. Although not shown, a hydrogen pole (fuel pole) may also be formed in manner as described above for the oxygen pole 10.

Protons ($H^+$s) permeate into the gas diffusing electrode (catalyst layer) 10 by way of the ion conducting section (proton conductor film) 5 from the side of the opposite electrode or from above in FIG. 1, while air (oxygen) permeates into the electrode 10 by way of the gas permeating collector (carbon sheet) 11 is ionized there. Then, protons and oxygen ions react (cell reaction) with each other in the electrode 10. As a result, electrochemical energy is taken out as output and water ($H_2O$) is produced there.

Note that the catalyst layer 19 that is a platinum layer formed by sputtering does not need to be a continuous film layer. It may be porous and partially discontinued. If it is a continuous film layer, it can block protons ($H^+$s) and gas such as oxygen trying to pass through it.

Electro-conductive powder or granule, which include carbon powder or granule or the like, can contain micro-pieces of many different profiles including particulate pieces, globular pieces, filament-like pieces and the like.

Figure 9:
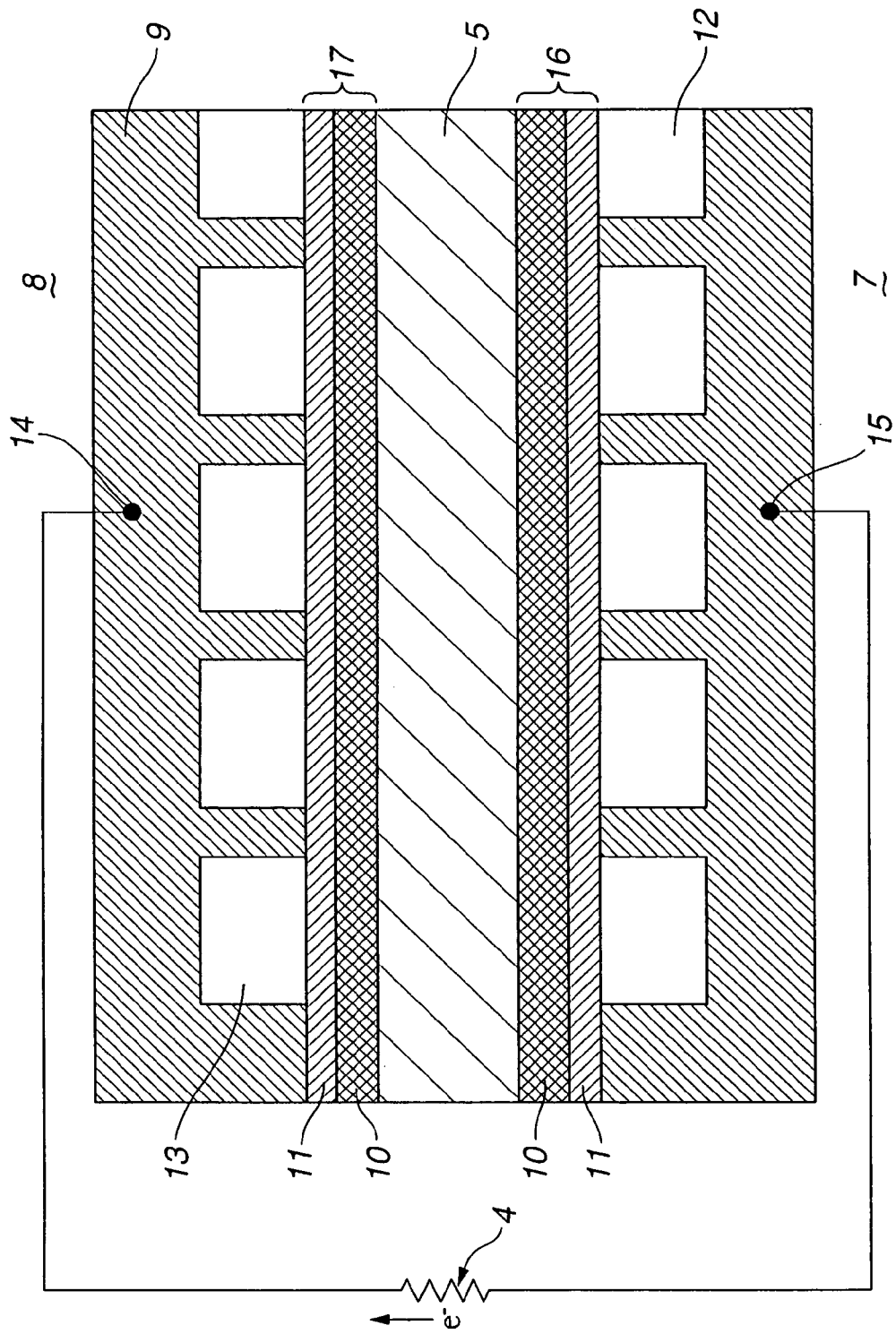
FIG. 9 is a schematic illustration of a fuel cell according to an embodiment of the present invention, showing its configuration.

FIG. 9 is a schematic illustration of a fuel cell according to an embodiment of the present invention, showing its configuration. Referring to FIG. 9, the fuel cell includes an ion conducting section (proton conductor film) 5 having a proton conducting property, a negative pole (fuel electrode) 16 and a positive pole (oxygen electrode) 17, the negative pole (fuel electrode) 16 and the positive pole (oxygen electrode) 17 being arranged on the opposite surfaces of the ion conducting section 5, although the configuration of a fuel cell will be described in greater detail hereinafter.

As hydrogen is supplied to the negative pole (fuel electrode) 16 and oxygen (air) is supplied to the positive pole (oxygen electrode) 17, a cell reaction takes place to give rise to electromotive power. In the case of so-called direct methanol system, methanol may be supplied to the negative pole (fuel electrode) 16 as hydrogen source.

The negative pole (fuel electrode) 16 and the positive pole (oxygen electrode) 17 are formed by molding an electrode material mainly containing carbon powder or granule 1.

As shown in FIG. 1, this embodiment has a multilayer structure formed by alternately laying carbon powder or granule layers 11 and catalyst layers 19 that are sputtered platinum layers. A gas diffusing electrode having such a configuration provides a large area in which gas and the catalyst metal can contact each other so as to make an electrode react to take place efficiently. Such a configuration makes it possible to realize a low profile fuel cell.

The carbon powder or granule that is the primary material of the electrode is required to be electro-conductive. Therefore, any of graphite type various carbon materials, carbon nano-tubes and the like can be used according to an embodiment of the present invention. Particularly, needle-shaped graphite pieces are preferably be used from the viewpoint of achieving a high gas diffusing effect.

Carbon nano-tubes are obtained by arranging a cathode and an anode, which are carbon rods typically made of graphite, in a vacuum reaction chamber with a gap separating them from each other, supplying a DC current to the electrodes to cause an arc discharge to take place in an atmosphere of rare gas such as helium and refining the carbon material deposited on the inner surface of the reaction chamber.

When a carbon material produced by the above described method is used as electrode material, a negative pole (fuel electrode) or a positive pole (oxygen electrode) can be directly formed on a gas permeating collector 11. Techniques that can be used forming a pole on a collector 11 include spin coating, spraying, dropping and bar coating.

With a spin coating method, carbon powder or granule is dispersed in solvent, which may typically be water or ethanol, and the solvent is dropped directly on a rotating collector. With a spraying method, carbon powder or granule is dispersed in solvent, which may typically be water or ethanol, and the solvent is sprayed onto a collector. With a dropping method, carbon powder or granule is dispersed in solvent, which may typically be water or ethanol, and the solvent is dropped directly on a collector. With any of the above described pole forming method, carbon powder or granule is deposited on the collector.

Carbon nano-tubes show a filament-like profile with a diameter of about 1 nm and a length of about 1 to about 10 μm. Each piece of needle-like graphite has a diameter of about 0.1 to about 0.5 μm and a length of about 1 to about 50 μm. Such oblong pieces are entangled with each other to easily form a layer without using any binding agent, although a binder may be used whenever necessary. In other words, a binder dispersing solution may be used when applying carbon powder or granule onto a gas permeating collector (carbon sheet). A sputtering method may be used when a vapor phase film forming process is involved.

The gas diffusing electrode (catalyst layer) 10 may be made to contain a catalyst substance (platinum). To do this, a film layer of the catalyst substance may be formed by means of a vapor phase film forming method such as sputtering or a mixture containing particles of the catalyst substance may be used. For instance, a 1000 nm thick film of the catalyst substrate (platinum) can be formed on a substrate by applying DC 1A, 420V to a platinum target having a diameter of 5 inch and carrying out a sputtering operation for 8 minutes and 8 seconds, while driving the substrate to rotate.

In the case of a negative pole (fuel cell) or a positive pole (oxygen electrode) formed by using a gas diffusing electrode according to the invention, it is no longer necessary to form it separately as self-standing electrode because it is formed directly on a gas diffusing collector (carbon sheet) typically by spin coating. Therefore, it is not required to show a mechanical strength that can resist the risk of damages during various processes. In other words, the gas diffusing electrode can be made to be as thin as about 10 μm or less, typically between about 2 and about 4 μm. However, it may alternatively be prepared as self-standing electrode. Conventional similar structures are single layer structures or multilayer structures comprising identical layers having a thickness of about 50 μm.

Materials that can be used for the proton conducting body of a fuel cell according to an embodiment of the present invention include not limitatively proton (hydrogen ion) conducting polymer materials, such as perfluorosulfonic acid resins (e.g., Nafion®: tradename, available from Du Pont), polyhydrated polymolybdenum acids, such as $H_3Mo_{12}PO_{40}\cdot 29H_2O$, polyhydrated oxides, such as $Sb_2O_5\cdot 5.4\ H_2O$, substances obtained by introducing proton-dissociating groups into various carbon materials including Fullerene and mixtures of a compound mainly based on silicon oxide and Brönsted acid, a polymer having side chains of sulfonic groups and/or the like.

Polymer materials such as perfluorosulfonic acid resins, polyhydrated polymolybdenum acids and polyhydrated oxides show a high proton conductivity at or near room temperature when placed in a wet condition. Take perfluorosulfonic acid resin for example. Protons electrolytically dissociated from sulfonic acid groups of the resin are bonded to moisture that is taken up to a large extent into a polymer matrix (hydrogen bond) to produce protonated water, or oxonium ions ($H_3O^+$). Since protons in the form of oxonium ions can smoothly move through a polymer matrix, the latter shows a considerably high proton conduction effect at room temperature. A proton conductor having a conduction mechanism totally different from such a material may alternatively be used. Proton conductors of the latter type include composite metal oxides having a perovskite structure such as $SrCeO_3$ doped with ytterbium (Yb). It has been found that composite metal oxides having a perovskite structure shows proton conductivity without using water as proton moving medium. It is believed that protons are conducted through oxygen ions that form the skeleton of the perovskite structure as they channel through by themselves.

As pointed out above, materials that can be used for the proton conducting body of a fuel cell according to an embodiment of the present invention include substances obtained by introducing proton-dissociating groups into various carbon materials such as Fullerene. Proton-dissociating groups as used herein refer to functional groups that can electrolytically dissociate protons, such as —OH, —$OSO_3H$, —$SO_3H$, —COOH, —$OPO(OH)_2$ and/or the like, and the expression of "dissociation of protons ($H^+$s)" refers to separation of protons from functional groups due to electrolytic dissociation. Protons move through a proton conductor by way of proton-dissociating groups to make it show ion conductivity. While any carbon materials can be used for the purpose of the invention so long as they contain carbon atoms as principal ingredient, it is necessary that the material shows an ion conductivity that is higher than the electron conductivity of the material after introducing proton-dissociating groups into it. Specific examples of such carbon materials include carbon clusters that are agglomerates of carbon atoms and materials containing tube-shaped carbon (so-called carbon nano-tubes).

While various carbon clusters are known, Fullerene, carbon clusters having an open end at part of the Fullerene structure and those having a diamond structure may suitably be used for the purpose of the invention.

Now, carbon clusters will be described in greater detail below.

A carbon cluster is normally an agglomerate of several to hundreds atoms formed as a result of gathering, or agglomeration. If atoms of an agglomerate are carbon atoms, the agglomerate (mass) improves the proton conductivity of carbon. At the same time, it shows a sufficient film strength and is apt to form a layer, while maintaining the chemical properties of carbon.

A cluster containing carbon as principal ingredient is a mass formed as several to hundreds of carbon atoms are bound together regardless of the form of carbon-carbon bonds. Such a cluster is not necessarily formed 100% by carbon atoms and may contain atoms other than carbon atoms. Thus, a cluster mainly containing carbon atoms is also referred to as carbon cluster. In a proton conductor containing a carbon material having proton-dissociating groups, protons can easily be dissociated from such proton-dissociating groups even in a dry condition and conducted to a large extent in a broad temperature range (at least from about 160° C. to about −40° C.) including room temperature.

As pointed out above, while the proton conductor shows a sufficient proton conductivity in a dry condition, moisture may exist with it. Moisture may enter from the outside.

The number of layers of the multilayer structure of this embodiment is preferably between 2 and 100. If the number of layers is less than 2, the structure is simply a single layer structure and does not provide the advantages of the present invention because it does not structurally differ from the prior art. On the other hand, if the number of layers exceeds 100, protons ($H^+$s) and air (oxygen) can mainly contact the sputtered platinum layers 19 on and near the outer periphery of the electrode to quickly give rise to an electrode reaction in the initial stages of penetration into the gas diffusing electrode (catalyst layer) 10 so that protons ($H^+$s) and air (oxygen) may hardly get to the inside of the gas diffusing electrode (catalyst layer) 10 and hence an internal part of the latter may not participate in the electrode reaction and becomes simply wasted. Each of the carbon powder or granule layers becomes thin when the number of the layers is increased without changing the thickness of the electrode. However, the gas permeability of the electrode is damaged to suppress the cell reaction and reduce the output level if the number of the carbon powder or granule layers and the sputtered platinum (catalyst metal) layers 19 is raised to over 100 layers. Additionally, the overall thickness of the electrode may also be increased. Therefore, the optimal number of layers under the above described conditions is typically between 5 to 6 for both the layers 22 and the layers 19. However, the situation may change if carbon powder or granule layers can be formed to show a much lower profile without losing their functions, if partly. Preferably, a carbon powder or granule layer is combined with a sputtered platinum layer 19. For example, when a carbon powder or granule layer having a thickness of several micrometers is formed by using carbon powder or granule with a particle diameter of tens of several nanometers, the gas diffusing electrode may advantageously be formed by using 100 or less than 100 such layers.

In this embodiment, each electro-conductive carbon powder or granule layer for conducting electrons is made to show a thickness of several nanometers to several micrometers, while each sputtered platinum layer 19 operating as catalyst layer for decomposing working gas such as oxygen or hydrogen into protons and electrons or ionizing oxygen has a thickness of several nanometers to hundreds of several nanometers.

The layers formed by using electro-conductive carbon powder or granule may be replaced by a substance other than a carbon material if the latter shows electro-conductive and performs predetermined functions.

The outer diameter, the weight, the forming method and the number of layers of carbon powder or granule to be used for the above described embodiment may be modified without limitations from the above listed respective values if they provide the predetermined effects.

The layers of carbon powder or granule of the embodiment are formed by a method selected from spin coating, printing, spray drying and vapor phase film forming. However, any method other than those listed above may be used if it provides the predetermined effects. A thickness that is out of the above defined range may be selected for each layer if it provides the predetermined effects.

The sputtered platinum layers 19 of the above described embodiment that operate as catalyst for decomposing working gas such as oxygen or hydrogen into protons and electrons may be replaced by some other catalyst metal if it provides the predetermined effects. In other words, it is not necessary to form the layers 19 by using platinum. The thickness of each layer may be modified appropriately if it provides the predetermined effects.

If the predetermined effects are provided, a third layer and/or an underlayer may be arranged between the gas permeating collector (carbon sheet) and the embodiment of gas diffusing electrode body.

Thus, the above described embodiment of gas diffusing electrode body comprises a multilayer structure realized by alternately laying first layers at least made of electro-conductive powder or granule and second layers made of a catalyst substance so that oxygen penetrating the gas diffusing electrode body is efficiently ionized by each of the catalyst substance layers in the gas diffusing electrode body and produced ions are brought into contact with protons ($H^+$s) over an extended area to improve the efficiency of reaction in the electrode to raise the output level. Thus, the embodiment performs excellently in each of its layers and, therefore, operates highly effectively and efficiently if each of the layers and hence the entire embodiment have a reduced thickness.

Since the layers of the multilayer structure of the above described embodiment of gas diffusing electrode body are laid sequentially one on the other, the multilayer structure can be formed relatively easily. In other words, a gas diffusing electrode body according to an embodiment of the present invention can be manufactured with an enhanced level of reproducibility. In this regard, the present invention provides a gas diffusing electrode body including carbon powder or granule layers and catalyst metal layers laid sequentially and alternately one on the other.

Thus, with a method of manufacturing a gas diffusing electrode body according to an embodiment of the present invention, carbon powder or granule layers and layers containing catalyst metal are sequentially and alternately laid one on the other.

In another embodiment of the present invention, there is provided a fuel cell including a pair of gas diffusing electrodes arranged oppositely with a proton conductor film interposed between them, at least one of the pair of gas diffusing electrodes comprising carbon powder or granule layers and catalyst metal layers laid sequentially and alternately one on the other.

Thus, a gas diffusing electrode according to an embodiment of the present invention and including carbon powder or granule layers and catalyst metal layers laid sequentially and alternately one on the other can efficiently perform an electrode reaction can be made to show a low profile.

A method of manufacturing a gas diffusing electrode according to an embodiment of the present invention can manufacture a gas diffusing electrode body including carbon powder or granule layers and catalyst metal layers laid sequentially and alternately one on the other with ease.

A fuel cell according to an embodiment of the present invention includes a pair of gas diffusing electrodes arranged oppositely with a proton conductor film interposed between them, at least one of the pair of gas diffusing electrodes comprising carbon powder or granule layers and catalyst metal layers laid sequentially and alternately one on the other. Such a fuel cell can be down-sized so as to show a low profile.

SECOND EMBODIMENT

Figure 2:
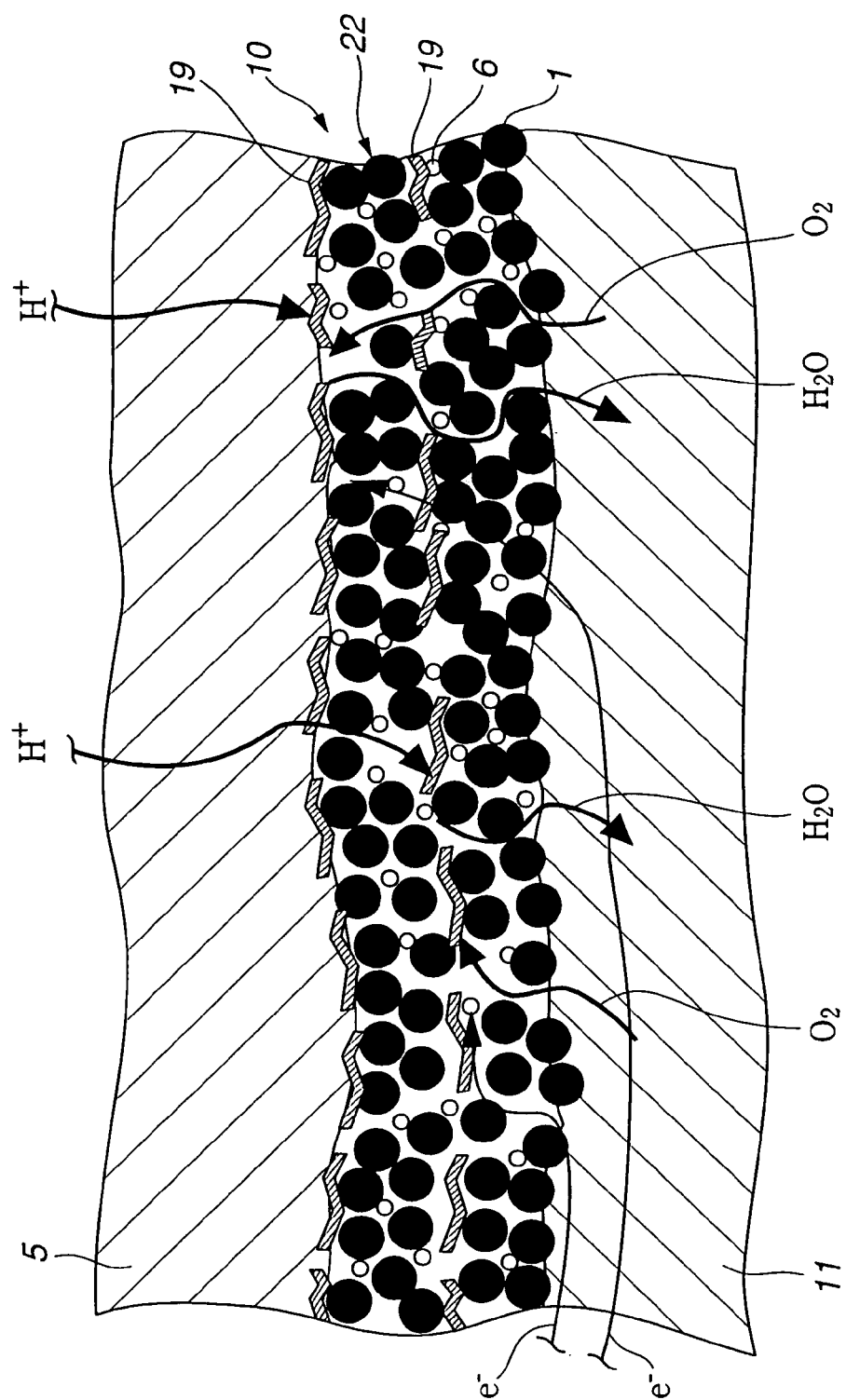
FIG. 2 is a schematic cross sectional view of part of another embodiment of gas diffusing electrode body according to an embodiment of the present invention.

FIG. 2 schematically illustrates a second embodiment of gas diffusing electrode body according to the invention. The second embodiment differs from the first embodiment only in that platinum powder 6 having a uniform particle diameter is added as catalyst to the layers of carbon powder or granule. Otherwise, the second embodiment is identical with the first embodiment. If the predetermined effects are obtained, the platinum powder 6 that is added as catalyst may be replaced by powder of some other catalyst metal. The outer diameter of the platinum powder 6, the content (weight %) of platinum powder 6 in the layers formed by carbon powder or granule, the mixing method to be used for the second embodiment may be modified appropriately if the predetermined effects are obtained. If platinum powder 6 is added to each and every carbon powder or granule layer 22 of the gas diffusing electrode layer or not can be determined without restrictions by considering the predetermined effects, although it needs to be added to at least one of the carbon powder or granule layers 22.

Since this embodiment of gas diffusing electrode body contains platinum powder as catalyst metal, the catalysing effect of the electrode is raised to give rise to a high active electrode reaction. Otherwise, this embodiment provides advantages similar to those of the first embodiment.

THIRD EMBODIMENT

Figure 3:
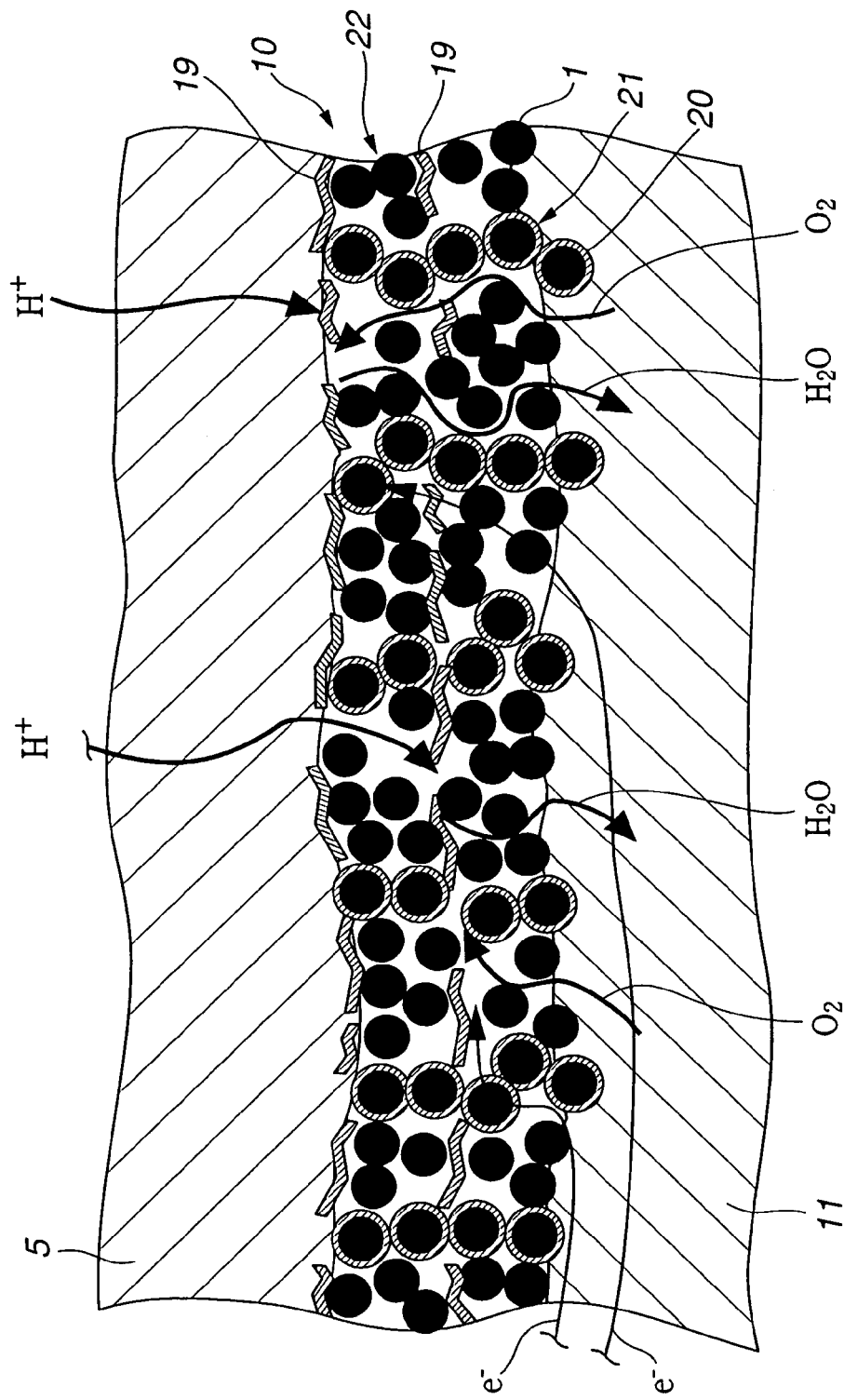
FIG. 3 is a schematic cross sectional view of part of still another embodiment of gas diffusing electrode body according to an embodiment of the present invention.

FIG. 3 schematically illustrates the third embodiment of gas diffusing electrode body according to the invention. The third embodiment differs from the first embodiment only in that particles of carbon powder or granule provided with an $H^+$ conducting film coat is further added to the layers mainly made of carbon powder or granule. Otherwise, the third embodiment is identical with the first embodiment.

As shown in FIG. 3, the surface of some of the spherical particles of carbon powder or granule 1 is covered by an $H^+$ conducting film coat 20 of a Fullerene derivative such as Fullerenol.

The profile of the particles of carbon powder or granule of this embodiment is not limited to spherical as shown in FIG. 3. An $H^+$ conducting film coat 20 can be formed on particles showing many different profiles.

The thickness of the $H^+$ conducting film coats 20 that covers some of the particles of carbon powder or granule may be that of a single molecule layer or more and hence will be at least several nanometers. It is preferably not more than hundreds of several nanometers because the electro-conductivity of the coated particles of carbon powder or granule will be adversely affected if the thickness is too great. Preferably, the $H^+$ conducting film coats of carbon powder or granule is between 10 nanometers and tens of several nanometers. The surfaces of particles of carbon powder or granule can be covered by an $H^+$ conducting film coat 20 typically by dispersing $H^+$ conducting resin into solvent, immersing carbon powder or granule into the solvent and subsequently drying the solvent.

Part of the surface of each particle of carbon powder or granule that is coated with an $H^+$ conducting film coat may be further coated with a catalyst substance (e.g., platinum). Since particles of carbon powder or granule covered by an $H^+$ conducting film coat can easily agglomerate, such particles of carbon powder or granule 21 covered by an $H^+$ conducting film coat form continuous chain structures in the gas diffusing electrode (catalyst layer) 10 as shown in FIG. 3. Therefore, the chain structures formed by particles of carbon powder or granule 21 covered by an $H^+$ conducting film coat accelerate the flow of proton gas ($H^+$) so that the pores (gaps) that allow proton gas ($H^+$) to pass through are maintained to diffuse gas sufficiently.

It is believed that particles of carbon powder or granule provided with an $H^+$ conducting film coat operates advantageous for activating cell reactions when the gas diffusing electrode (catalyst layer) 10 contains such particles of carbon powder or granule covered by an $H^+$ conducting film coat by about 1 to about 80 weight %, preferably by about 20 to about 70 weight %. If the weight % of particles of carbon powder or granule covered by an $H^+$ conducting film coat is too low, the flow of proton gas ($H^+$) is reduced in the gas diffusing electrode (catalyst layer) 10 to prevent gas from passing through and consequently reduce the cell reaction.

If, on the other hand, the weight % of particles of carbon powder or granule covered by an $H^+$ conducting film coat is too high, particles of carbon powder or granule poorly contact with each other and become distributed unevenly to provide only an insufficient electron conductivity to consequently reduce the cell reaction, although proton gas ($H^+$) may be able to flow easily.

In the case of a negative pole (fuel electrode) or a positive pole (oxygen electrode) formed by using a gas diffusing electrode according to the invention, it is no longer necessary to form it separately as self-standing electrode because it is formed directly on a gas diffusing collector (carbon sheet) typically by spin coating. Therefore, it is not required to show a mechanical strength that can resist the risk of damages during various processes. In other words, the gas diffusing electrode can be made to be as thin as about 10 μm or less, typically between about 2 and about 4 μm. However, it may alternatively be prepared as self-standing electrode.

For this embodiment, the content (weight %) of particles of carbon powder or granule, that of particles of carbon powder or granule provided with an $H^+$ conducting film coat and the method of mixing them may be modified freely provided that the predetermined effects are obtained. Additionally, the type of $H^+$ conducting material, the method of making it adhere to particles of carbon powder or granule and the thickness of the adhering film coat may be modified freely provided that the predetermined effects are obtained.

Since the layers made of carbon powder or granule of this embodiment of gas diffusing electrode body contains particles of carbon powder or granule provided with an $H^+$ conducting film coat, proton gas ($H^+$) entering from the ion conducting section sufficiently permeate into the gas diffusing electrode through the $H^+$ conducting film coats to give rise to a high active electrode reaction.

Otherwise, this embodiment provides advantages similar to those of the first embodiment.

FOURTH EMBODIMENT

Figure 4:
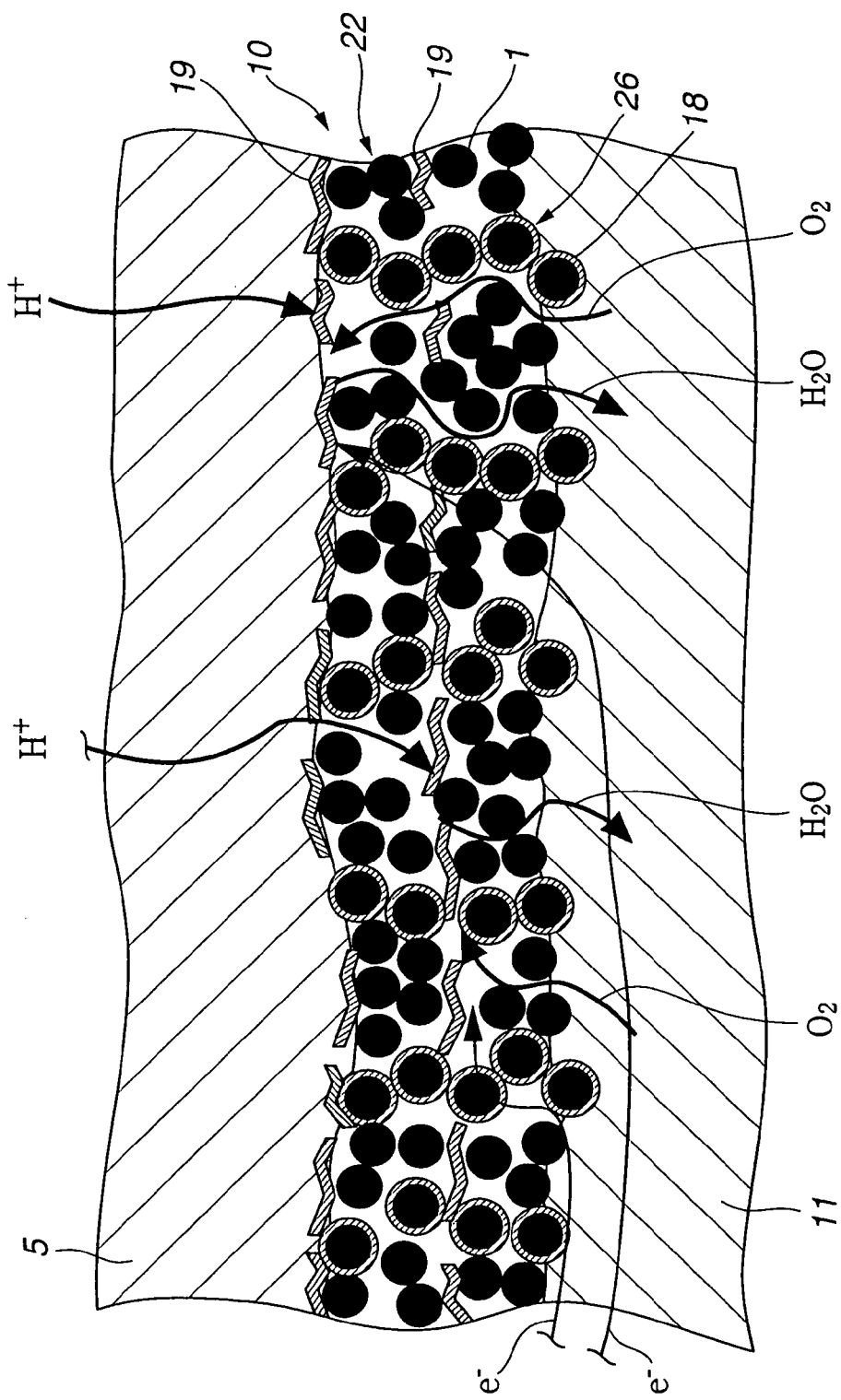
FIG. 4 is a schematic cross sectional view of part of still another embodiment of gas diffusing electrode body according to an embodiment of the present invention.

FIG. 4 schematically illustrates the fourth embodiment of gas diffusing electrode body according to the invention. The fourth embodiment differs from the first embodiment only in that particles of carbon powder or granule provided with a water-repellent film coat 26 are further added to the layers mainly made of carbon powder or granule. Otherwise, the fourth embodiment is identical with the first embodiment.

As shown in FIG. 4, the surfaces of some of the spherical particles of carbon powder or granule 1 are covered by a water-repellent film coat 18. The profile of the particles of carbon powder or granule of this embodiment is not limited to spherical as shown in FIG. 4. A water-repellent film coat can be formed on particles showing many different profiles. The thickness of the water-repellent film coat 18 that covers some of the particles of carbon powder or granule may be that of a single molecule layer or more and hence will be at least several nanometers. It is preferably not more than hundreds of several nanometers because the electro-conductivity of the coated particles of carbon powder or granule will be adversely affected if the thickness is too great. Preferably, the water-repellent film coats covering particles of carbon powder or granule has a thickness between 10 nanometers and tens of several nanometers.

Part of the surface of each particle of carbon powder or granule that is covered by a water-repellent film coat may be further coated with a catalyst substance (e.g., platinum).

Since water generated as a result of intra-electrode reaction does not adhere to the surfaces of particles 26 of carbon powder or granule having a water-repellent film coat 18 formed thereon, water generated within the electrodes will not remain there excessively as it is repelled by the film coat but will be discharged from the electrodes to secure gaps through which oxygen gas permeates. Therefore, the supply of oxygen gas into the gas diffusing electrode, or the positive pole, would not be blocked. As a result, oxygen gas is supplied to the electrode at a sufficient rate and hence the output of the cell can be maintained to a relatively high level.

The surfaces of particles of carbon powder or granule 1 can be covered by a water-repellent film coat 18 by dispersing water-repellent resin into a solvent, immersing particles of carbon powder or granule into the solvent and subsequently drying the particles.

Materials that can be used for forming the water-repellent film coat 18 include fluorine-containing compounds such as polyvinylidene fluoride (PvdF), fluorine type polymers (e.g., $C_2F_6$ polymer) and Teflon (tradename, PTFE available from Du Pont). Techniques that can be used forming the water-repellent film coat 18 include the dipping method and the plasma CVD method.

Since particles of carbon powder or granule covered by a water-repellent film coat that are used for a gas diffusing electrode repel water, water would not adhere to the outer surfaces of carbon powder or granule. Furthermore, since similar particles of carbon powder or granule covered by a water-repellent film coat can easily agglomerate, such particles of carbon powder or granule 26 covered by a water-repellent film coat form continuous chain structures in the gas diffusing electrode (catalyst layer) 10 as shown in FIG. 4. Then, the chain structures formed by particles of carbon powder or granule 26 covered by a water-repellent film coat produce walls that prevent generated water ($H_2O$) from penetrating and also paths that are used effectively to drain generated water so that the pores (gaps) that allow $O_2$ gas to pass through are maintained to diffuse gas sufficiently.

It is believed that particles of carbon powder or granule provided with a water-repellent film coat operate advantageously for activating cell reactions when the gas diffusing electrode (catalyst layer) 10 contains particles of carbon powder or granule covered by a water-repellent film coat by about 1 to about 80 weight %, preferably by about 20 to about 70 weight %. If the content by weight % of carbon powder or granule whose particles are provided with a water-repellent film coat is too small, water generated within the gas diffusing electrode (catalyst layer) 10 as a result of a cell reaction can adhere to the surfaces of particles of carbon powder or granule to a large extent without being discharged from the electrode and remain within the electrode to fill the gaps through which gas can otherwise pass. Then, gas is prevented from permeating and consequently the cell reaction is weakened. If, on the other hand, the content by weight % of carbon powder or granule whose particles are provided with a water-repellent film coat is too large, particles of the carbon powder or granule of the electrode cannot contact freely and become distributed unevenly to reduce the electron conductivity and weaken the cell reaction.

In the case of a negative pole (fuel cell) or a positive pole (oxygen electrode) formed by using a gas diffusing electrode according to the invention, it is no longer necessary to form it separately as self-standing electrode because it is formed directly on a gas diffusing collector (carbon sheet) typically by spin coating. Therefore, it is not required to show a mechanical strength that can resist the risk of damages during various processes. In other words, the gas diffusing electrode can be made to be as thin as about 10 μm or less, typically between about 2 and about 4 μm. However, it may alternatively be prepared as self-standing electrode.

For this embodiment, the content of particles of carbon powder or granule, that of particles of carbon powder or granule provided with a water-repellent film coat and the method of mixing them may be modified freely provided that the predetermined effects are obtained.

Additionally, the type of water-repellent material, the method of making it adhere to particles of carbon powder or granule and the thickness of the adhering film coat may be modified freely provided that the predetermined effects are obtained.

Electro-conductive powder or granule that can be used for this embodiment is not limited to carbon. Some other material that shows electro-conductivity and provides the predetermined effects may alternatively be used.

As pointed out above, this embodiment of gas diffusing electrode is formed by using mainly electro-conductive carbon powder or granule, with which particles of electro-conductive powder or granule whose particles are provided with a water-repellent film coat is further mixed. Thus, water generated in the gas diffusing electrode body is effectively repelled by the water-repellent film coats of the particles of the electro-conductive carbon powder or granule and drained from the gas diffusing electrode without adhering to the electro-conductive carbon powder or granule. As a result, permeation of gas is not hindered by generated water and a sufficient gas permeability is secured within the gas diffusing electrode body.

Furthermore, a gas diffusing electrode body according to the invention can be formed by mixing electro-conductive carbon powder or granule whose particles are provided with a water-repellent film coat with the other materials, it can be manufactured relatively easily without requiring a complex process.

Otherwise, this embodiment provides advantages similar to those of the first embodiment.

FIFTH EMBODIMENT

Figure 5:
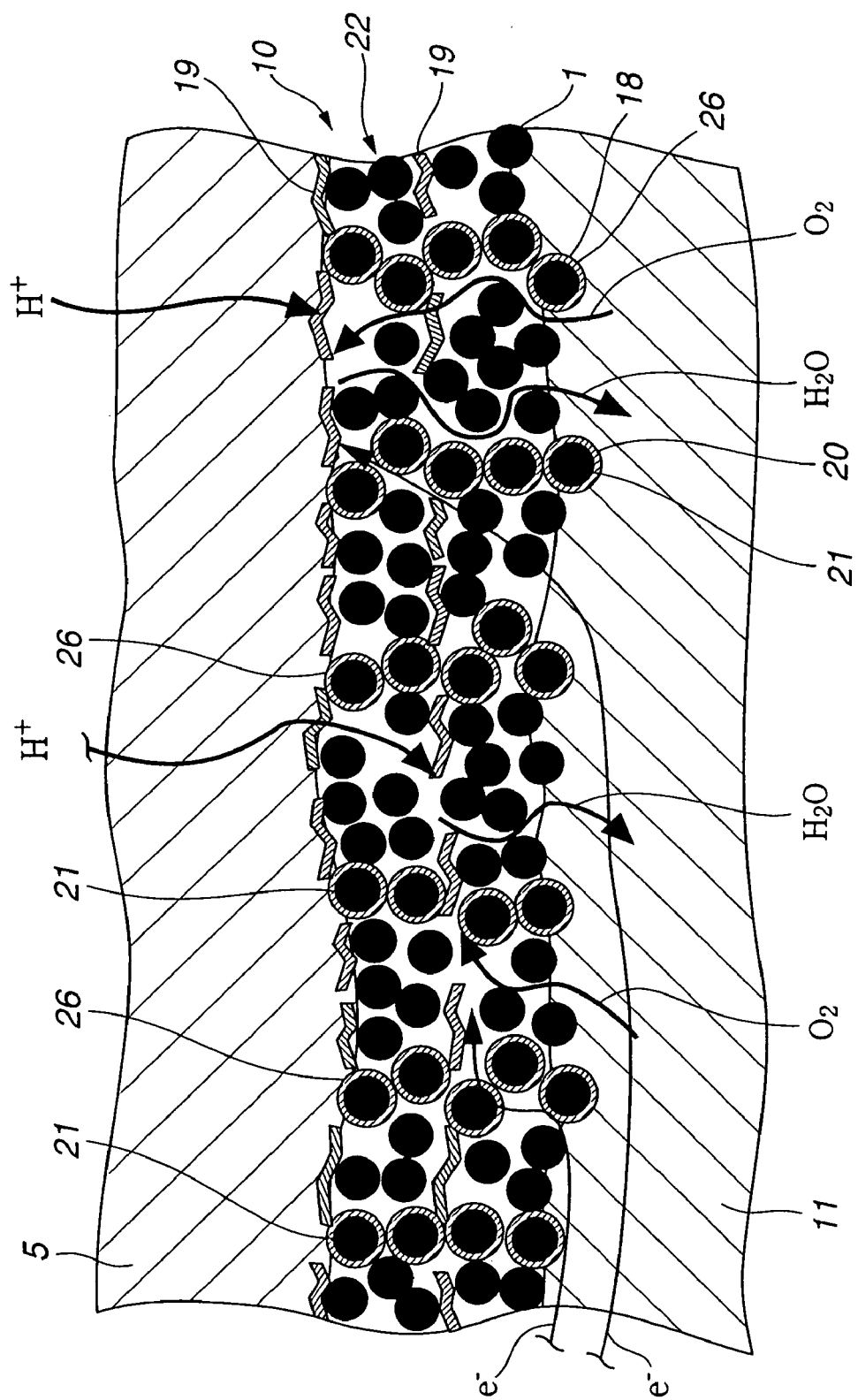
FIG. 5 is a schematic cross sectional view of part of still another embodiment of gas diffusing electrode body according to an embodiment of the present invention.

FIG. 5 schematically illustrates the fifth embodiment of gas diffusing electrode body according to the invention. The fifth embodiment differs from the first embodiment only in that particles of carbon powder or granule provided with a water-repellent film coat 26 and those provided with an $H^+$ conducting film coat 21 are further added to the layers 22 mainly made of carbon powder or granule. Otherwise, the fifth embodiment is identical with the first embodiment.

Since particles of carbon powder or granule provided with a water-repellent film coat 26 and those provided with an $H^+$ conducting film coat 21 that are used for the mixture are described in detail by referring to the third and fourth embodiments, they will not be described here any further.

In this embodiment, particles of carbon powder or granule provided with an $H^+$ conducting film coat 21 and those of carbon powder or granule provided with a water-repellent film coat 26 similar to those as described above are added to the carbon powder or granule layer 22 and the mixing ratio (weight %) of each type of carbon particles, the mixing method, the thickness of the layer may be modified appropriately if the predetermined effects are obtained.

Since the layers mainly made of carbon powder or granule of this embodiment of gas diffusing electrode body contains particles of carbon powder or granule provided with an $H^+$ conducting film coat, proton gas ($H^+$) entering from the ion conducting section sufficiently permeate into the gas diffusing electrode through the $H^+$ conducting film coats 20 and efficiently contact the catalyst metal to give rise to a high active electrode reaction.

Since this embodiment of gas diffusing electrode body is formed by using mainly electro-conductive carbon powder or granule, with which particles of electro-conductive carbon powder or granule 26 whose particles are provided with a water-repellent film coat 18 is further mixed, water generated in the gas diffusing electrode body is effectively repelled by the water-repellent film coats 18 of the particles of the electro-conductive carbon powder or granule 26 and drained from the gas diffusing electrode without adhering to the electro-conductive powder or granule. As a result, permeation of gas is not hindered by generated water and a sufficient gas permeability is secured within the gas diffusing electrode body.

Furthermore, a gas diffusing electrode body according to the invention can be formed by mixing electro-conductive carbon powder or granule whose particles are provided with a film coat with the other materials, it can be manufactured relatively easily without requiring a complex process.

Since this embodiment is realized by using both particles of electro-conductive carbon powder or granule 21 covered by a proton conducting film coat and those powder or granule 26 covered by a water-repellent film coat, the effect of improving the proton conductivity and the water-repellent effect are synergistically combined to provide an active and highly efficient cell reaction.

Otherwise, this embodiment provides advantages similar to those of the first embodiment.

Figure 6A:
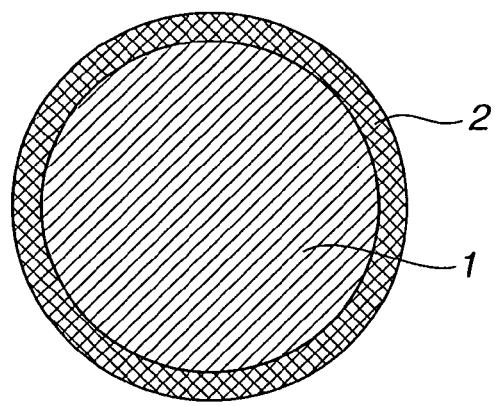
FIGS. 6A through 6C are schematic cross sectional views of particles of electro-conductive carbon powder or granule that can be used according to an embodiment of the present invention.
Figure 6B:
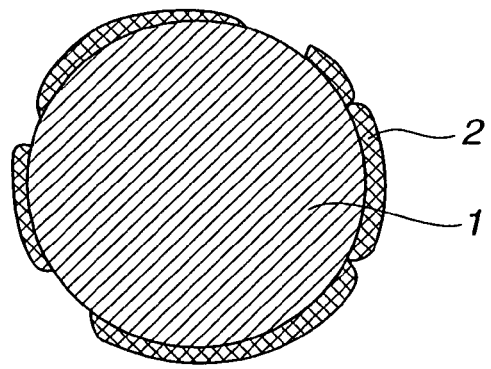
Figure 6C:
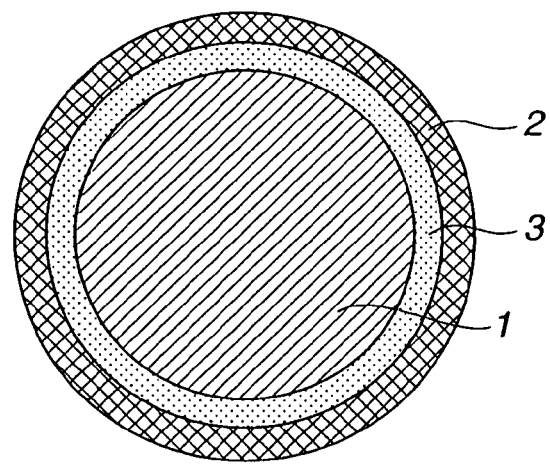

FIGS. 6A, 6B and 6C are schematic cross sectional views or particles of electro-conductive carbon powder or granule that can be used for this embodiment.

Since a physical film forming process is typically used for this embodiment, platinum (catalyst) 2 adheres to the surfaces of the particles of the obtained electro-conductive carbon powder or granule 1 as shown in FIG. 6A. Such electro-conductive powder or gain provides an excellent catalytic effect with a small amount and also a sufficient contact area between the catalyst and gas. In other words, it is possible to obtain a relatively large specific surface area for the catalyst that participates in a reaction and improve the catalysing ability of the catalyst.

For this embodiment, platinum (catalyst) 2 may adhere unevenly to the surfaces of the particles of electro-conductive carbon powder or granule 1 as shown in FIG. 6B. Such an arrangement of platinum 2 can provide an excellent catalysing effect with a relatively small amount of catalyst as in the case of electro-conductive carbon powder or granule whose granules having a structure as shown in FIG. 6A and also a sufficient contact area between the catalyst and gas. In other words, it is possible to obtain a large specific surface area for the catalyst that participates in a reaction and improve the catalysing ability of the catalyst.

In place of causing platinum (catalyst) 2 to adhere to the surfaces of particles of electro-conductive carbon powder or granule and form a coat film there by means of a physical film forming process, it is also possible to cause an ion conducting substance 3 to adhere to the surfaces of particles of electro-conductive carbon powder or granule and then platinum (catalyst) 2 to further adhere to surfaces of particles carrying the ion conductive substance and form a film coat there by means of a physical film forming process as shown in FIG. 6C. Because platinum (catalyst) 2 is caused to adhere to the surfaces of particles of electro-conductive carbon powder or granule by means of a physical film forming process, it is no longer necessary to subject the work to a heat treatment process for the purpose of improving the crystallinity of the catalyst unlike conventional methods. Then, it is possible to cause the catalyst to adhere to the surfaces of particles of electro-conductive carbon powder or granule without damaging the ion conducting property of the ion conducting electrode.

With any of the particles of electro-conductive carbon powder or granule illustrated in FIGS. 6A, 6B and 6C, the catalyst is made to adhere to electro-conductive carbon powder or granule preferably at a rate of about 10 to about 1,000 weight % relative to the electro-conductive carbon powder or granule. Preferably, a metal having an electron conductivity is used as catalyst. Examples of such metals include platinum, ruthenium, vanadium and tungsten. A mixture of any of such metals can also be used as catalyst for the purpose of the invention.

While electro-conductive carbon powder or granule 1 is not subjected to any particular limitations so long as it is acid-resistant, electro-conductive and available at low cost, preferable examples of electro-conductive carbon powder or gain include powdery carbon and ITO (indium-tin oxide), of which powdery carbon is particularly favorable for the purpose of the present invention. The average particle size of carbon powder to be used for the purpose of the invention is preferably about 1 μm or less, more preferably between about 0.005 and about 0.1 μm.

Examples of physical film forming methods that can be preferably used for causing the catalyst to adhere to the surfaces of particles of electro-conductive carbon powder or granule include sputtering, pulse laser deposition (PLD) and vacuum evaporation. The use of sputtering as physical film forming process is advantageous because it is easy to use and provides a high productivity and a good film forming effect. The pulse laser deposition method is advantageous for physical film forming processes because the latter can be controlled with ease if the method is used. The film forming effect of the method is also excellent.

PCT Patent Application Laid-Open Publication No. 11-510311 describes a method of forming a film of a noble metal on a carbon sheet by sputtering. For the above described embodiment of the present invention, on the other hand, platinum that operate as catalyst is made to adhere to the surfaces of particles of electro-conductive carbon powder or granule. The method of the present invention is more advantageous than the method described in PCT Patent Application Laid-Open Publication No. 11-510311 because the specific surface are of platinum operating as catalyst can be made greater and the catalysing ability of the catalyst can be improved with the former method.

Additionally, for this embodiment of the present invention, when causing platinum that operates as catalyst to adhere to the surfaces of particles of electro-conductive carbon powder or granule to form a film coat on the surfaces by a physical film forming method, the electro-conductive carbon powder or granule is preferably subjected to vibrations in order to cause a sufficient amount of catalyst to adhere uniformly to each carbon particle.

While any appropriate mechanism may be used for applying vibrations to the electro-conductive carbon powder or granule, a preferably mechanism will be such that platinum that operates as catalyst is made to adhere to the surfaces of particles of electro-conductive carbon powder or granule by means of a physical film forming process, while an ultrasonic wave is being applied to generate vibrations in the carbon powder or granule. With this embodiment of the invention, electro-conductive carbon powder or granule obtained by causing platinum that operates as catalyst to adhere to the surfaces of the particles thereof can be bound together typically by means of resin. Additionally, the electro-conductive carbon powder or granule is preferably retained on a porous gas permeating collector such as a carbon sheet.

As described above, this embodiment of gas diffusing electrode according to an embodiment of the present invention may be substantially made of electro-conductive carbon powder or granule whose particles are provided with a film coat or it may contain electro-conductive carbon powder or granule and resin for binding the particles of the powder or granule as well as other ingredients. In the latter case, such other ingredients may include a pore forming agent (e.g., $CaCO_3$) and ion conductors. Additionally, the electro-conductive carbon powder or granule is preferably retained on a porous gas permeating collector such as a carbon sheet.

Examples of ion conductors that can be used in a gas diffusing electrode and also in the ion conducting section sandwiched between the first and second poles of an electrochemical device according to the invention include Nafion® (tradename, perfluorosulfonic acid resin available from Du Pont) as well as Fullerene derivatives such as Fullerenol (Fullerene-polyhydrorxide).

Figure 7B:
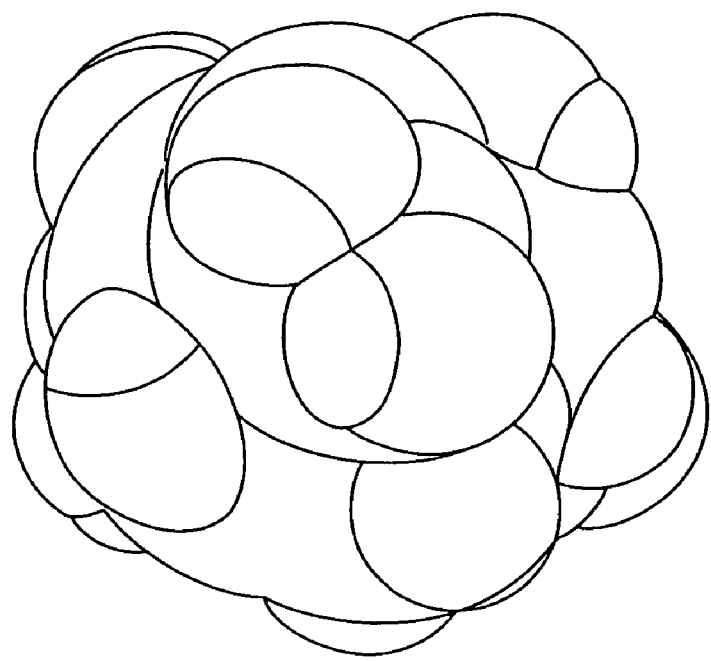
FIGS. 7A and 7B are schematic illustrations of the structure of poly-Fullerene hydroxide, which is a Fullerene derivative that can be used according to an embodiment of the present invention.
Figure 7A:
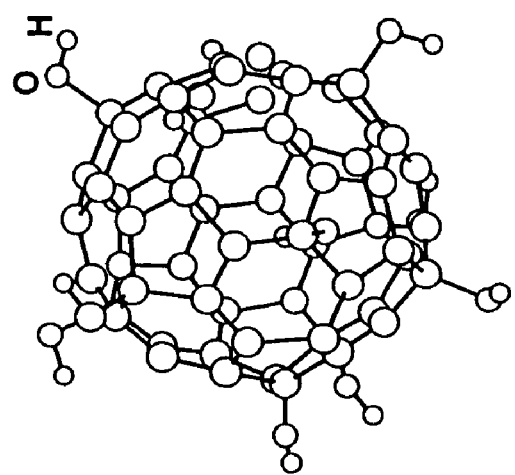

Particularly, synthesis of Fullerenol having a chemical structure obtained by adding a plurality of hydroxyl groups as shown in FIGS. 7A and 7B was firstly reported by Chiang et al. in 1992 (Chiang, L. Y.; Swirczewski, J. W.; Hsu, C. S.; Chowdhury, S. K.; Cameron, S.; Creegan, K., J. Chem. Soc., Chem. Commun., 1992, 1791).

Figure 8A:
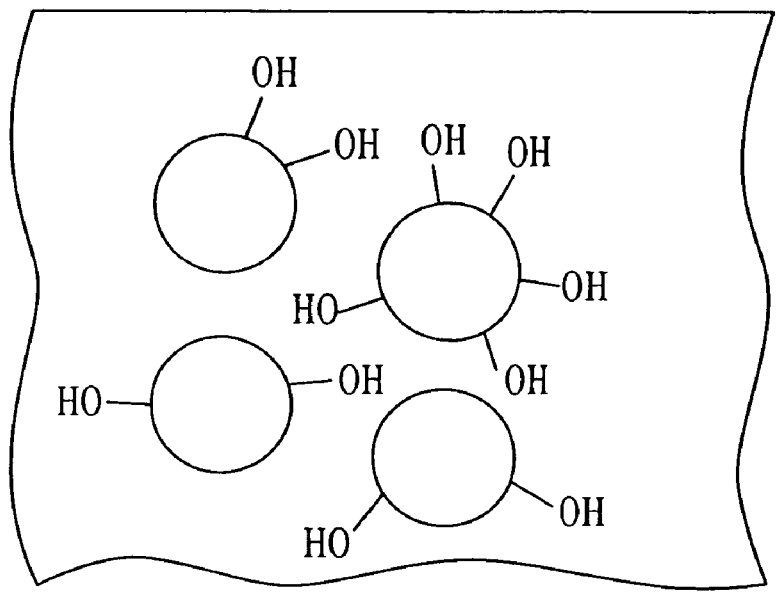
FIGS. 8A and 8B are schematic illustrations of Fullerene derivatives that can be used according to an embodiment of the present invention.

The applicant of the present patent application caused hydroxyl groups of Fullerenol molecules that were brought close to each other for forming agglomerates as shown in FIG. 8A (○ denotes a Fullerene molecule in FIG. 8A) to act on each other and found for the first time that the agglomerate shows a high proton conductivity as macro-aggregate and $H^+$s are easily dissociated from phenolic hydroxyl groups of Fullerenol molecules.

Figure 8B:
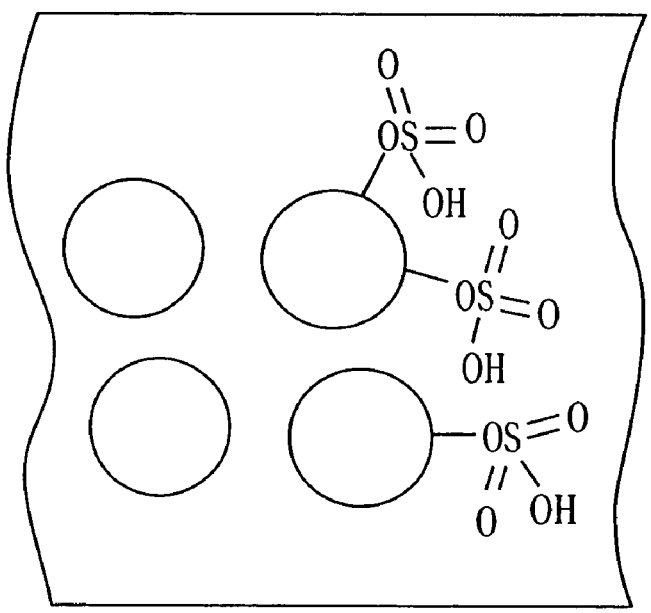

For this embodiment of the present invention, Fullerene agglomerates having a plurality of —$OSO_3H$ groups may be used as ion conductor other than Fullerenol. Poly-Fullerene hydroxide obtained by replacing OH groups with $OSO_3H$ groups as shown in FIG. 8B was also reported by Chiang et al. in 1994 (Chiang, L. Y.; Wang, L. Y.; Swirczewski, J. W.; Soled, S.; Cameron, S., J. Org. Chem., 1994, 59, 3960). Fullerene hydrogensulfate may have only $OSO_3H$ groups or $OSO_3H$ groups and hydroxyl groups at a same time in each molecule.

When Fullerenol and Fullerenol hydrogensulfate are made to produce a large number of agglomerates, protons coming from a large number of hydroxyl groups and $OSO_3H$ groups of molecules of these compounds directly participate in the movement of protons so that it is not necessary to take in hydrogen and protons from the atmosphere, steam molecules and other sources to secure a desired level of proton conductivity for the bulk. In other words, it is not necessary to externally supply moisture from outer air. Therefore, the atmosphere does not need to be subjected to restrictions. Thus, a gas diffusing electrode according to the invention can be used continuously even in a dry atmosphere.

Fullerene from which such molecules as listed above are formed shows an excellent proton conductivity because it has a high electrophilicity, which, it is believed, participate in promoting the electrolytic dissociation of hydrogen ions not only from highly acidic $OSO_3H$ groups but also from hydroxyl groups. Additionally, because a considerable number of hydroxyl groups and $OSO_3H$ groups can be introduced into each molecule, the numerical density of proton conductors that participate in proton conduction is very high to realize an effective conductivity level.

Since Fullerenol and Fullerenol hydrogensulfate are constituted mostly by carbon atoms of Fullerene, they are lightweight and chemically hardly modified. They do not contain environment-contaminating substances. Furthermore, the Fullerene manufacturing cost is falling rapidly. Thus, it will be safe to say that Fullerene is a desirable carbon material from the viewpoint of resource, environment and economy if compared with other materials. Furthermore, it is possible to make Fullerene molecules have any of —COOH, —$SO_3H$ and —$OPO(OH)_2$ in addition to —OH and —$OSO_3H$.

When synthetically producing Fullerenol and other materials that can be used for the purpose of the present invention, desired groups are introduced to carbon atoms of Fullerene molecules by using known processes such as acid treatment and hydrolysis in combination. When a Fullerene derivative is used as ion conductor for the ion conducting section, it is preferably that the ion conductor is substantially made of only the Fullerene derivative or bound together by means of a binding agent.

This embodiment of gas diffusing electrode according to the invention can suitably be used for various electrochemical devices having a first pole, a second pole and an ion conductor sandwiched by the two poles as basic structure. More specifically, a gas diffusing electrode according to the invention can be used at least for the first pole of the first and second poles.

To be more accurate, a gas diffusing electrode according to the invention can suitably be used for an electrochemical device having first and second poles, at least one of which is a gas electrode.

Now, a fuel cell realized by using a gas diffusing electrode according to the invention will be described specifically and briefly by referring to FIG. 9.

The illustrated fuel cell includes a negative pole 16 and a positive pole 17 that are disposed vis-a-vis and formed by using respective gas diffusing electrode 10 and a ion conducting section 5 sandwiched between the two poles. The negative pole 16 is a fuel electrode or hydrogen electrode, whereas the positive pole 17 is an oxygen electrode, the ion conducting section 5 being realized as a proton conductor section. Terminals 15, 14 are drawn respectively from the negative pole 16 and the positive pole 17 and connected to a load 4 that is an external circuit.

When the fuel cell is in use, hydrogen is supplied from an inlet port (not shown) and discharged from an outlet port (not shown) at the negative pole 16. The outlet port may be omitted.

While fuel gas ($H_2$) is driven to pass through $H_2$ flow path 12, hydrogen is diffused into the negative pole, where protons ($H^+$s) are generated. Then, the generated protons ($H^+$s) move to the positive pole 17 along with the protons generated in the ion conducting section (proton conductor section) and react with the oxygen (air) that is supplied to $O_2$ flow path 13 and directed toward its outlet port (not shown) so that consequently desired electromotive force can be taken out.

Although not referred to in the above description of the arrangement, the hydrogen supply source stores a hydrogen occluding alloy and/or a hydrogen occluding carbon material. The hydrogen occluding carbon material may be made to occlude hydrogen in advance before it is stored in the hydrogen supply source.

Since the fuel cell includes a first pole and/or a second pole formed by using this embodiment of gas diffusing electrode according to an embodiment of the present invention, it provides an excellent catalysing effect and can secure a sufficient contact areas for the catalyst and gas ($H_2$ or the like) so that the catalyst participating in the reaction can have a large specific surface area to improve its catalysing ability and ensure a good output performance. Additionally, hydrogen ions are dissociated in the negative pole 16 and also in the ion conducting section 5 and move toward the positive pole 17 so that the fuel cell shows a high ion conductivity even in a dry condition. Therefore, a fuel cell according to an embodiment of the present invention does not require the use of a moisturizing device so that the entire system can be simplified and lightweight. Thus, the electrodes show an improved performance particularly in terms of current density and output characteristics.

The film-shaped ion conducting body that is formed by compression-molding a Fullerene derivative and sandwiched between the first and second poles may be replaced by an ion conducting section 5 formed by binding a Fullerene derivative together by means of a binding agent. Then, the ion conducting section will show a satisfactory strength because a binding agent is used for binding the Fullerene derivative together. Polymer materials that can be used as binding agent for the purpose of the invention include known polymers having a film forming property, of which one or more than one will be used. The polymer content of the ion conducting section is normally about 20 weight % or less because the hydrogen ion conductivity of the ion conducting section can be reduced if the polymer content exceeds 20 weight %. Since the ion conducting section arranged in a manner as described above also contains a Fullerene derivative as ion conductor, it shows a satisfactory hydrogen ion conductivity just like an ion conducting section containing only a Fullerene derivative. Advantageously, the ion conducting section arranged in a manner as described above is provided with an excellent film forming property due to the polymer material added thereto unlike an ion conducting section containing only a Fullerene derivative. Therefore, it can be used as a flexible ion conducting thin film that shows an enhanced strength and a good gas permeation preventing ability if compared with a compressed and molded product of powder of a Fullerene derivative (having a film thickness of not greater than 300 μm).

There are no particularly limitations to polymer materials that can be used according to an embodiment of the present invention so long as they do not significantly degrade the hydrogen ion conductivity of the ion conducting section (due to the reaction with the Fullerene derivative) and shows a film forming ability. Normally, a polymer showing no electron conductivity and having an excellent stability will be selected. Examples of such polymers include polyfluoroethylene and polyvinylalcohol, which are preferable polymer materials for the purpose of the invention because of the following reasons. Polytetrafluoroethylene is preferably used according to an embodiment of the present invention because a thin film having an excellent strength can be formed with ease if it is contained only to a slight extent when compared with other polymer materials. The polytetrafluoroethylene content of the ion conducting thin film is not greater than about 3 weight %, preferably between about 0.5 and about 1.5 weight %, which is very low, so that the thin film can be made to show a small film thickness between about 1 and about 100 μm. Polyvinylalcohol is preferably used for the purpose of the present invention because it can form an ion conducting thin film showing an excellent gas permeation preventing ability. The polyvinylalcohol content of the ion conducting thin film is preferably between about 5 and about 15 weight %.

The film forming performance can be adversely affected if the content of polyfluoroethylene or polyvinylalcohol falls short of the above defined lower limit.

Various known film forming processes including compression molding and extrusion molding can be used for forming a thin film for the ion conducting section of this embodiment where a Fullerene derivative is bound together by means of a binding agent.

There are no specific limitations imposed on the ion conducting body sandwiched between a pair of gas diffusing electrodes in an electrochemical device according to the invention so long as it shows a good ion conductivity, a (hydrogen) ion conductivity in particular. Examples of materials that can be used for the purpose of the invention include Fullerene hydroxide, Fullerene hydrogensulfate and Nafion®. Additionally, a binding agent can be used as water-repellent resin for a gas diffusing electrode according to the invention.

Now, the present invention will be described further by way of examples without limitation to the scope of the present invention.

EXAMPLE 1

In this example, layers of carbon powder or granule 22 and (sputtered) platinum layers 19 are formed alternately on a gas permeating collectors (carbon sheet) to produce a gas diffusing electrode having a configuration as shown in FIG. 1. Then, a fuel cell was prepared by using the electrode.

For each layer of carbon powder or granule 22, paint obtained by dispersing 0.6 g of ordinary carbon powder or granule 1 (particle diameter: 30 to 40 nm) into 40 g of solvent NMP (N-methylpyrrolidone) was made to drop for 5 seconds by driving a spin coater to rotate at a rate of 500 rmp and subsequently for 30 seconds also by driving the spin coater to rotate at a rate of 1,000 rmp. Then, the dropped paint was heated and dried at 120° C.

On the other hand, a sputtered platinum (catalyst substance) film layer 19 was formed to a thickness of 20 nm by using a platinum target having a diameter of 5 inches and applying DC 1A, 420V, while driving a substrate to rotate for sputtering for 8 minutes and 8 seconds.

5 layers of 300 nm thick carbon powder or granule 22 were formed by spin coating to make the total thickness equal to 1,500 nm. Similarly 5 layers of 20 nm thick (sputtered) platinum layers 19 were formed by sputtering to make the total thickness equal to 100 nm. To be more accurate, they were formed alternately on a gas permeating collector (carbon sheet) to produce a 1.6 µl thick gas diffusing electrode.

Then, the obtained gas diffusing electrode layer was placed between an ion exchange film (proton conducting section) made of nylon and a collector electrode and hydrogen gas and oxygen gas were introduced into the fuel cell. The relationship between the number of layers of carbon powder or granule (to be referred to simply as number of layers hereinafter) and the output voltage of the fuel cell was observed.

EXAMPLE 2

A gas diffusing electrode was prepared as in Example 1 except that platinum powder 6 with a particle diameter of 2 to 3 nm was added to the layer of carbon powder or granule 22 by 20 weight %.

The obtained gas diffusing electrode layer was placed between an ion exchange film (proton conducting section) made of nylon and a collector electrode and hydrogen gas and oxygen gas were introduced into the fuel cell. The relationship between the number of layers of carbon powder or granule and the output voltage of the fuel cell was observed. The result will be described in detail hereinafter.

EXAMPLE 3

A gas diffusing electrode was prepared as in Example 1 except that particles of carbon powder or granule 21 provided with an $H^+$ conducting film coat of Fullerenol were added to the layers of carbon powder or granule 22 as shown in FIG. 3.

The thickness of the $H^+$ conducting film coats 20 formed on particles of carbon powder or granule 21 was within a range between 10 nanometers and tens of several nanometers. The compounding ratio of the particles of carbon powder or granule 21 provided with an $H^+$ conducting film coat and those of carbon powder or granule 1 without a film coat was 1:1 by weight.

The weight of the $H^+$ conducting film coats took 30% of the total weight of the particles of carbon powder or granule 21 provided with an $H^+$ conducting film coat of an $H^+$ conducting Fullerene derivative. Particles of carbon powder or granule 21 provided with an $H^+$ conducting film coat and those of carbon powder or granule 1 without any $H^+$ conducting film coat were mixed.

The obtained gas diffusing electrode was mounted in a fuel cell as in Example 1 and the output of the cell was observed.

EXAMPLE 4

A gas diffusing electrode was prepared as in Example 1 except that particles of carbon powder or granule 26 provided with a water-repellent film coat 18 were added to the layers of carbon powder or granule 22 as shown in FIG. 4.

The thickness of the water-repellent coats formed on particles of carbon powder or granule was within a range between 10 nanometers and tens of several nanometers. The compounding ratio of the particles of carbon powder or granule provided with a water-repellent film coat and those of carbon powder or granule without a film coat was 1:1 by weight.

The weight of the water-repellent coats took 30% of the total weight of the particles of carbon powder or granule provided with a water-repellent film coat. Particles of carbon powder or granule provided with a water-repellent film coat and those of carbon powder or granule without any water-repellent film coat were mixed.

The obtained gas diffusing electrode was mounted in a fuel cell as in Example 1 and the output of the cell was observed.

EXAMPLE 5

A gas diffusing electrode was prepared as in Example 1 except that particles of carbon powder or granule 21 provided with an $H^+$ conducting film coat and those of carbon powder or granule 26 provided with a water-repellent film coat were added to the layers of carbon powder or granule 22 as shown in FIG. 5.

Both the thickness of the water-repellent film coats formed on particles of carbon powder or granule 26 and that of the $H^+$ conducting film coats formed on particles of carbon powder or granule 21 were within a range between 10 nanometers and tens of several nanometers. The compounding ratio of the particles of carbon powder or granule 26 provided with an $H^+$ conducting film coat, those of carbon powder or granule 21 provided with a water-repellent film coat and those of carbon powder or granule without a film coat was 0.5:0.5:1 by weight.

Water-repellent film coats were formed on particles of carbon powder or granule 26 by immersing carbon powder or granule into a Teflon solution and then drying it. The weight of the water-repellent coats of Teflon took 30% of the total weight of the particles of carbon powder or granule provided with a water-repellent film coat.

$H^+$ conducting film coats were formed on particles of carbon powder or granule 21 by immersing carbon powder or granule into a tetrahydrofurane solution of a Fullerene derivative and then drying it. The weight of the $H^+$ conducting film coats of the Fullerene derivative took 30% of the total weight of the particles of carbon powder or granule provided with an $H^+$ conducting film coat.

Particles of carbon powder or granule provided with a water-repellent film coat, those of carbon powder or granule provided with an $H^+$ conducting film coat and those of carbon powder or granule without any film coat were mixed.

The obtained gas diffusing electrode was mounted in a fuel cell as in Example 1 and the output of the cell was observed.

COMPARATIVE EXAMPLE 1

In this comparative example, a fuel cell was prepared by using a conventional gas diffusing electrode prepared by spraying a dispersed solution containing platinum particles having an average particle diameter of 100 nanometers onto a 2 µm thick gas permeating collector (carbon sheet).

The content of platinum particles of the dispersed solution was 20 weight % and the volume of the dispersed solution was 200 µ liter. The dispersed solution infiltrated into the carbon sheet.

The obtained gas diffusing electrode layer was placed between an ion exchange film (proton conducting section) and a collector electrode and hydrogen gas and oxygen gas were introduced into the fuel cell. The relationship between the number of layers of carbon powder or granule and the output voltage of the fuel cell was observed.

COMPARATIVE EXAMPLE 2

In this comparative example, a fuel cell was prepared by using a conventional gas diffusing electrode prepared by spraying a dispersed solution same as the one used in Comparative Example 1 onto a 50 μm thick gas permeating collector (carbon sheet). Otherwise the procedure of Comparative Example 1 was followed.

The obtained gas diffusing electrode was placed between an ion exchange film (proton conducting section) and a collector electrode and hydrogen gas and oxygen gas were introduced into the fuel cell. The relationship between the number of layers of carbon powder or granule and the output voltage of the fuel cell was observed.

COMPARATIVE EXAMPLE 3

A fuel cell was prepared as in Comparative Example 1 except that a 1.5 μm thick layer of carbon powder or granule was arranged between the gas permeating collector (carbon sheet) and the dispersed solution of platinum particles.

The results obtained in the above examples and comparative examples are summarily listed below.

TABLE 1

| specimen | electrode thickness (μm) | electrode thickness (μm) |
|---|---|---|
| Example 1 | 1.6 | 0.6 |
| Example 2 | 1.6 | 0.7 |
| Example 3 | 1.6 | 0.7 |
| Example 4 | 1.6 | 0.6 |
| Example 5 | 1.6 | 0.7 |
| Comparative Example 1 | 2 | 0.4 |
| Comparative Example 2 | 50 | 0.6 |
| Comparative Example 3 | 3.5 | 0.4 |

As seen from above, the electrode of Example 1 had a thickness of 1.6 μm and the output voltage was 0.6 V. The cell operated well. The results of Examples 2 through 5 were similar to those of Example 1.

The electrode of Comparative Example 1 showed a thickness of 2 μm and a low output voltage of 0.4V. The electrode of Comparative Example 2 was as thick as 50 μm, although it produced a high output voltage of 0.6V. The outcome of Comparative Example 3 was similar to that of Comparative Example 1.

In Comparative Example 1, since platinum particles were dispersed sporadically, they operated poorly as catalyst and the output voltage was insufficient. While the output voltage of the specimen of Comparative Example 2 was sufficient, that of the specimen of Comparative Example 3 was similar to the value obtained in Comparative Example 1. The specimen of Comparative Example 2 was not suited for a low-profiled electrode, although the output voltage was sufficient.

The gas diffusing electrode of Example 1 showed a thickness of 1.6 μm, which was about one thirties of the thickness of the electrode of Comparative Example 2 but the output voltage (0.6 V) was as high as that of the specimen of Comparative Example 2. The output voltages of the specimens of Examples 2 through 5 were similar to that of the specimen of Example 1.

From the above results, it was proved that a fuel cell realized by using a gas diffusing electrode according to an embodiment of the present invention can be made to show a reduced profile if compared with fuel cells comprising conventional electrodes, while maintaining a relatively high output voltage.

Figure 10:
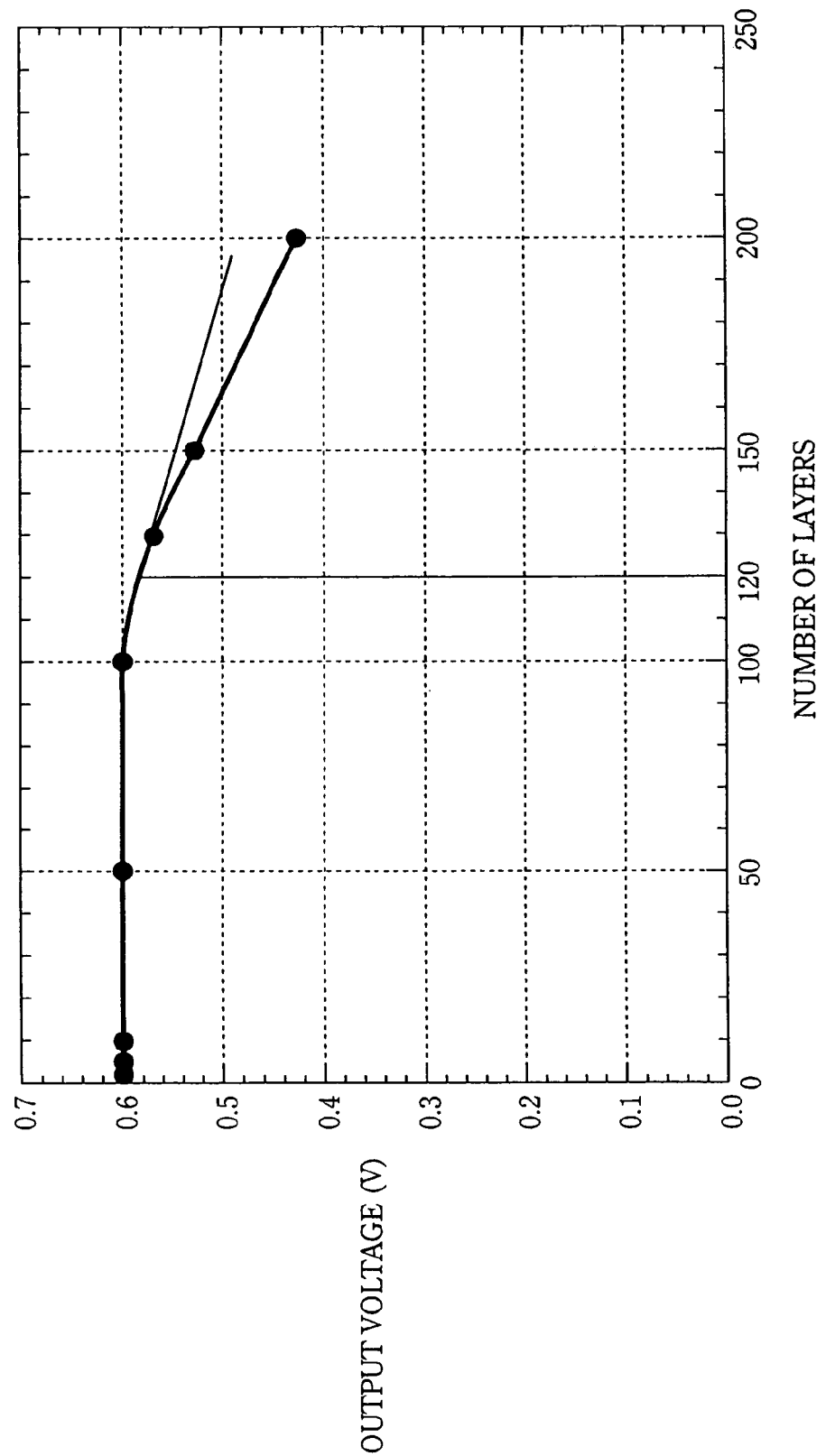
FIG. 10 is a graph illustrating the output performance of a fuel cell according to an embodiment of the present invention.

FIG. 10 is a graph showing the relationship between the output voltage and the number of layers of the gas diffusing electrode of the fuel cell of Example 1.

As seen from FIG. 10, the output voltage is maintained to about 0.6 V when the number of layer is not less than 2 and not more than 100 but gradually falls as the number of layers exceeds 100 to get to 0.54 V when the number of layers is raised to 150 and to 0.44 V when the number of layers becomes equal to 200.

Thus, the number of layers is preferably between 2 and 150 (less than 120 if possible) and more preferably between 2 and 100 for maintaining the output voltage to a relatively high level.

While the present invention is described above by way of preferred embodiments, they may be modified or altered appropriately without departing from the spirit and scope of the present invention.

For instance, the above described electrochemical device that is adapted to give rise to a cell reaction of decomposing $H_2$ may also be applied to producing $H_2$ or $H_2O$ by reversing the chemical process.

So long as the predetermined effects are achieved, the number of layers of carbon powder or granule and that of sputtered platinum layers may be differentiated in a gas diffusing electrode. Similarly, layers having different thicknesses and different compositions that are produced by different forming methods may be combined to form a multilayer structure.

According to an embodiment of the present invention, there is provided a gas diffusing electrode body including first layers made of at least electro-conductive powder or granule and second layers made of a catalyst substance laid alternately to form a multilayer structure. With such an arrangement, oxygen penetrating the gas diffusing electrode body is efficiently ionized in each of the catalyst layers to expand the area where ions contact protons ($H^+$s) and efficiently conduct reactions in the electrode so that a cell realized by using an electrode according to the invention performs excellent to produce a high output voltage. Since the above effects are achieved in each layer, the electrode operate highly effectively and efficiently if it is made very thin to reduce the overall thickness of the electrode.

The multilayer structure of a gas diffusing electrode body according to an embodiment of the present invention can be formed relatively easily by laying the layers one on the other. Thus, a gas diffusing electrode body according to an embodiment of the present invention can be manufactured with an enhanced level of reproducibility.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A method of manufacturing a gas diffusing electrode body, the method comprising:
    forming an alternating layer including a first layer and a second layer,
    the first layer including
        an electro-conductive carbon powder or granule thereof, and
        an electro-conductive carbon powder or granule thereof having a water-repellant film coat, and the second layer consisting essentially of one or more catalyst metals; and forming a multilayered structure including at least two of said alternating layers, wherein the alternating layers are laid sequentially, where a weight ratio of the electro-conductive carbon power or granule thereof to the electro-conductive carbon power or granule thereof having the water-repellant film coat is about 1:1.

2. A method of manufacturing a gas diffusing electrode body, the method comprising:

forming an alternating layer including a first layer and a second layer, the first layer including an electro-conductive carbon powder or granule thereof, and an electro-conductive carbon powder or granule thereof having a water-repellant film coat, and the second layer consisting essentially of one or more catalyst metals; and forming a multilayered structure including at least two of said alternating layers, wherein the alternating layers are laid sequentially, wherein the first layer further includes an electro-conductive carbon powder or granule thereof having an ion conducting film.

3. A method of manufacturing a gas diffusing electrode body, the method comprising:

forming an alternating layer including a first layer and a second layer, the first layer including an electro-conductive carbon powder or granule thereof, and an electro-conductive carbon powder or granule thereof having a water-repellant film coat, and the second layer consisting essentially of one or more catalyst metals; and forming a multilayered structure including at least two of said alternating layers, wherein the alternating layers are laid sequentially, wherein the electro-conductive carbon powder of granule thereof having the catalyst metal is made by depositing a catalyst metal on the electro-conductive carbon powder or granule thereof and with vibrating the electro-conductive carbon powder or granule thereof, wherein the first layer further includes an electro-conductive carbon powder or granule thereof having a catalyst metal.

* * * * *